No. 667,379. Patented Feb. 5, 1901.
J. W. WOOLERY.
COMBINED HAY RAKE AND STACKER.
(Application filed Mar. 1, 1900.)

(No Model.) 3 Sheets—Sheet 2.

Witnesses:
H. C. Rodgers
R. J. White

Inventor:
J. W. Woolery,
By Fischer & Thorpe
Atty's

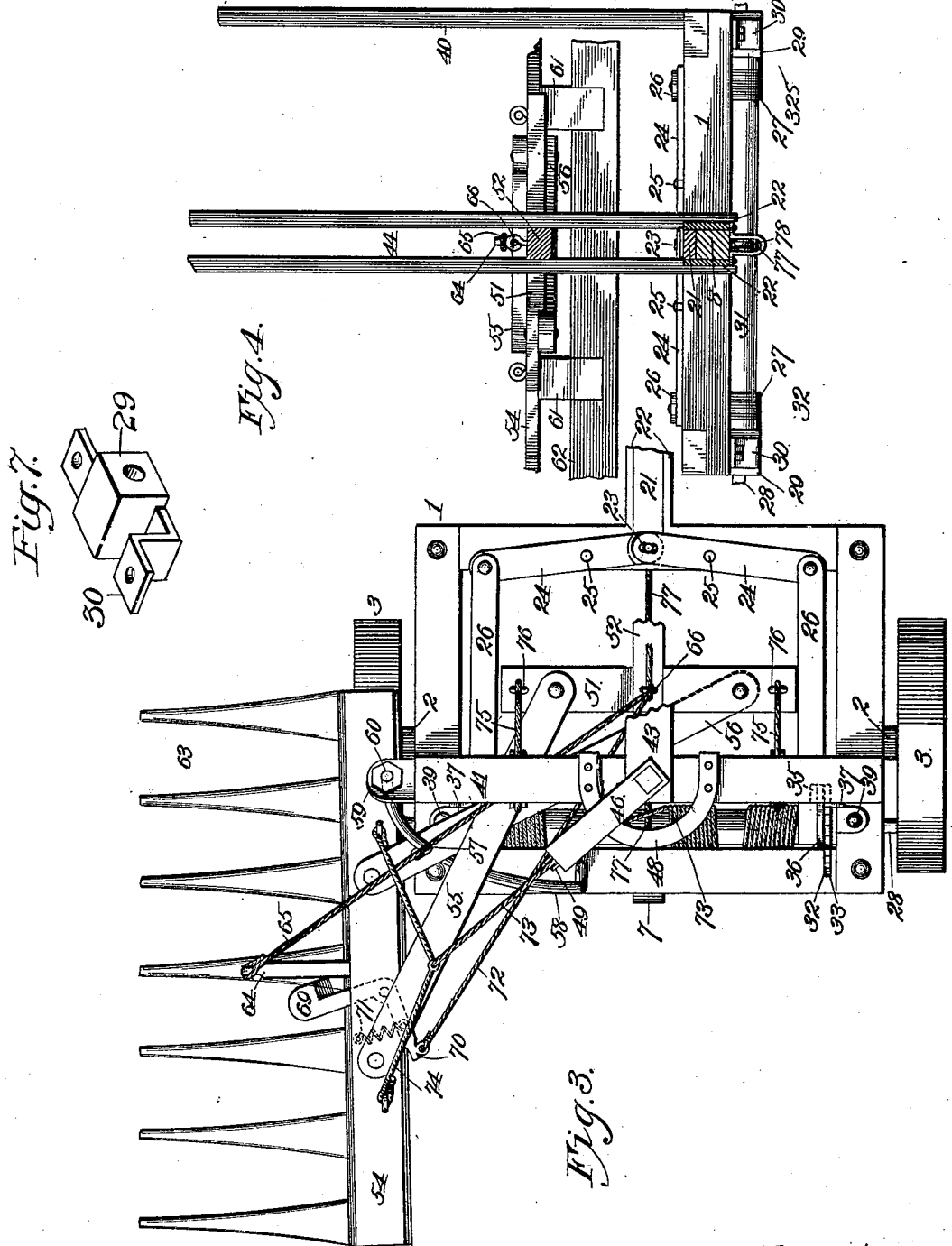

United States Patent Office.

JONATHAN W. WOOLERY, OF OLATHE, KANSAS, ASSIGNOR OF ONE-HALF TO EMIL E. VOIGTS, OF MERRIAM, KANSAS.

COMBINED HAY RAKE AND STACKER.

SPECIFICATION forming part of Letters Patent No. 667,379, dated February 5, 1901.

Application filed March 1, 1900. Serial No. 6,956. (No model.)

*To all whom it may concern:*

Be it known that I, JONATHAN W. WOOLERY, a citizen of the United States, residing at Olathe, in the county of Johnson and State of Kansas, have invented a new and useful Combined Hay Rake and Stacker, of which the following is a specification.

My invention relates to hay rakes and stackers; and my primary object is to produce a machine by which the hay can be gathered and elevated and then discharged at one side, so that the machine moving forward in the same direction may pass the stack without the necessity of backing or turning to either side.

A further object is to provide a construction wherein the same power which propels the machine is utilized to elevate the hay and to gradually lower the rake after the load is discharged.

A still further object is to provide means for automatically tripping the rake, and thereby discharging the load when it has attained the desired height.

With these and other objects in view the invention consists in certain novel and peculiar features of construction and combinations of parts, as will be hereinafter described and claimed, and in order that it may be fully understood I will proceed to describe it with reference to the accompanying drawings, in which—

Figure 1:
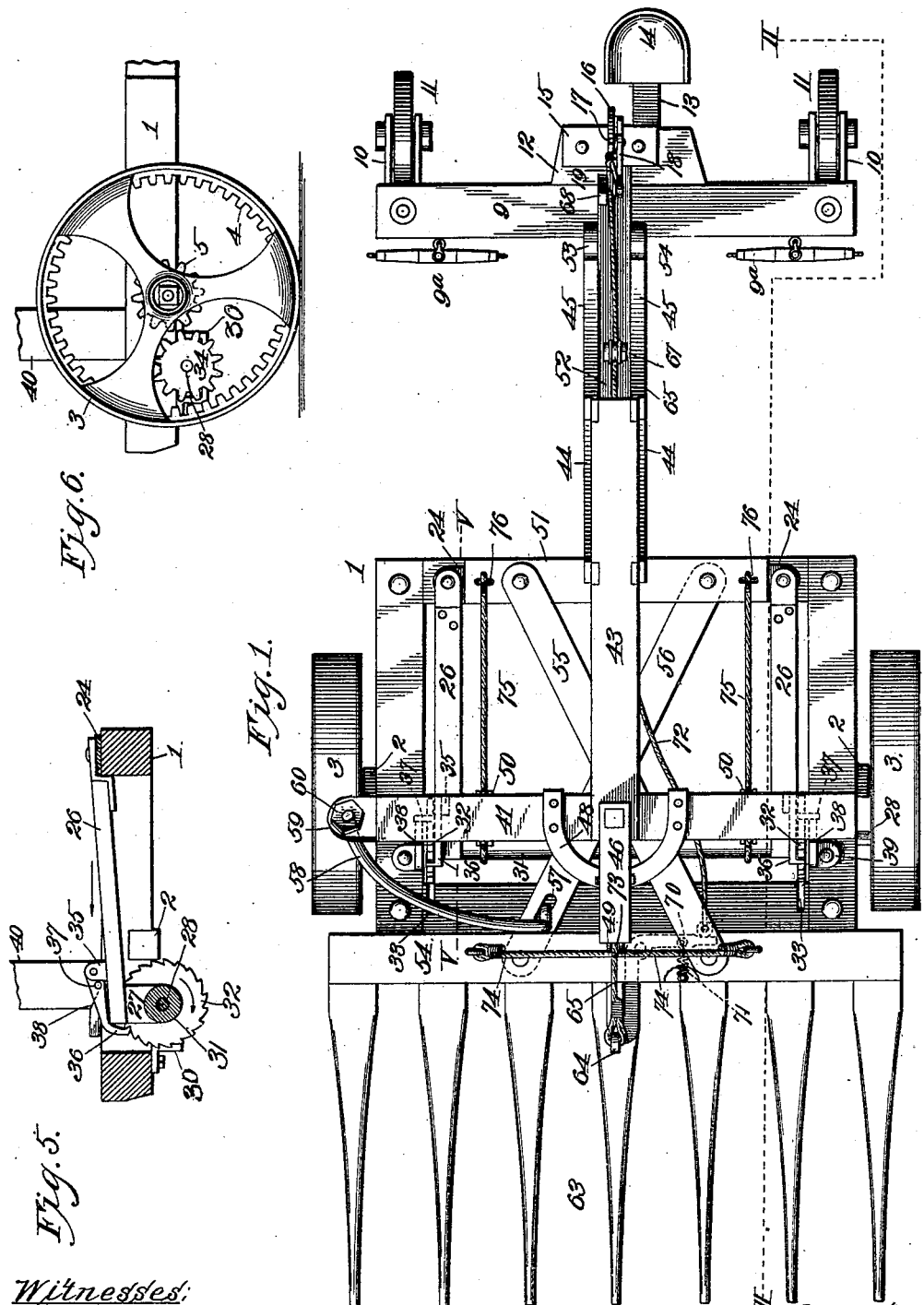
Figure 2:
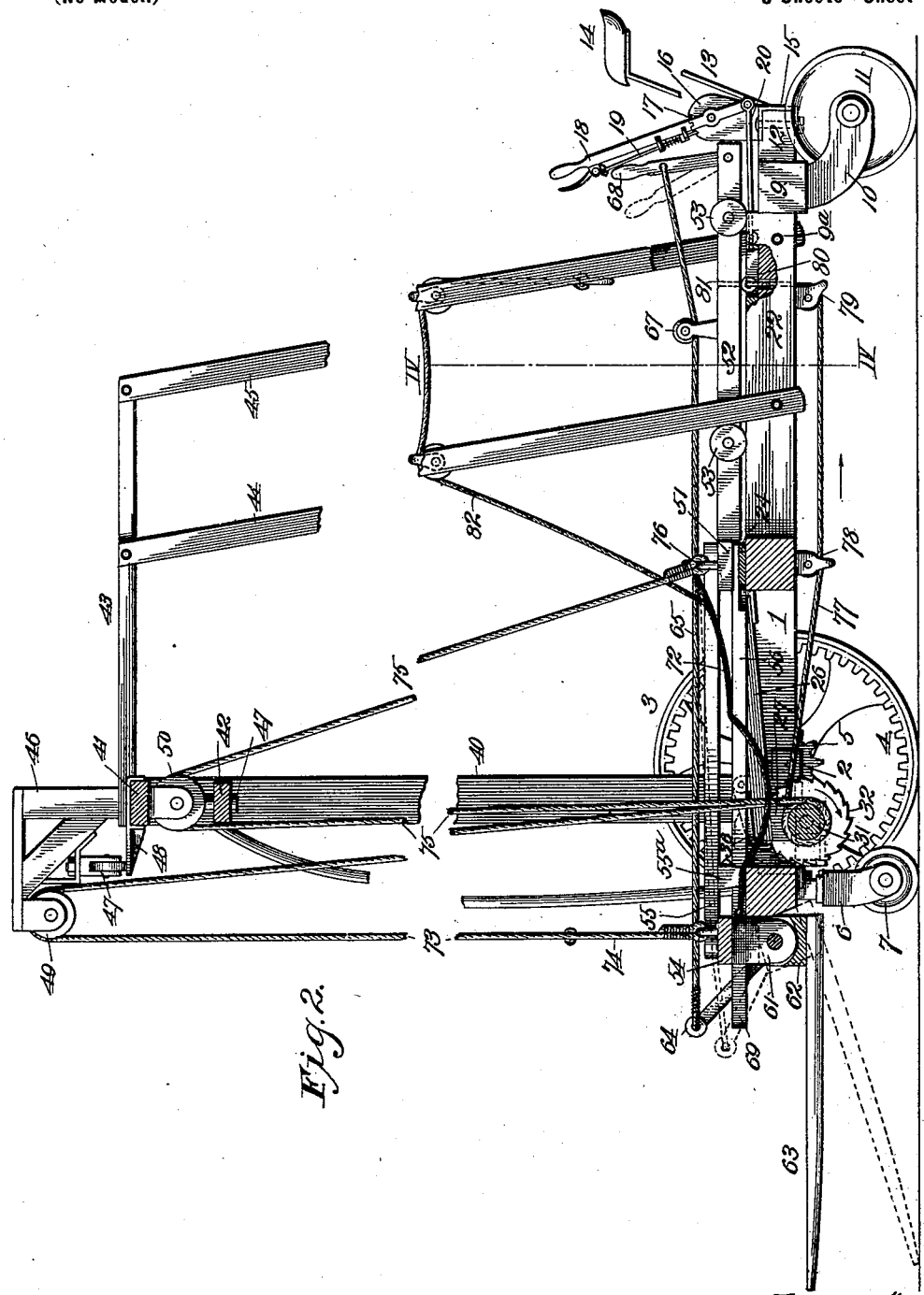

Figure 1 is a top plan view of a combined hay-rake and side-delivery stacker embodying my invention. Fig. 2 is a vertical longitudinal section taken on the line II II of Fig. 1. Fig. 3 is a top plan view of the front end of the machine with the parts operatively positioned in the act of discharging the load at one side. Fig. 4 is a section taken on the line IV IV of Fig. 2 with the rake-carrying frame partly elevated. Fig. 5 is a vertical section taken on the line V V of Fig. 1. Fig. 6 is a side view of part of the machine to illustrate the relation of the gearing whereby the movement of the forward carrying-wheels may be utilized to raise or lower the rake. Fig. 7 is a detail perspective view of one of the brackets and adjustable bearing-box mounted therein.

Referring now to the drawings, wherein similar reference-numerals designate corresponding parts in all the figures, 1 designates a rectangular frame arranged horizontally and provided with the outwardly-projecting stub shafts or axles 2, upon which are journaled the forward carrying-wheels 3, said wheels being provided or formed with internal cog-wheels 4 and small cog-pinions 5, the latter being arranged concentrically of and within the former. To prevent the machine tilting forward under a load of hay, a bracket 6, depending centrally from the front bar of the frame, is provided with the caster 7 to ride upon the ground.

8 designates a longitudinal beam extending rearward from the center of the rear part of frame 1 (see Fig. 4) and carrying at its rear end a cross-beam 9, provided at its front side with singletrees $9^a$ for attachment to the draft-animals, adapted to travel at opposite sides of beam 8 and between frame 1 and beam 9, as will be readily understood by reference to Fig. 1. Swiveled to the opposite ends of beam 9 are brackets 10, carrying large casters 11, which support the rear end of the machine, though it is to be understood that any other type of wheel-support may be employed.

12 designates a block secured to the rear side of beam 9, and secured to the same is a standard 13, surmounted by the seat 14 for the driver.

15 designates a bracket bolted to block 12 and provided with a sector 16, having by preference three notches 17, and pivoted upon said sector is a lever 18, carrying the usual spring-actuated dog 19 for engagement with one or another of said notches, the lower end of said lever being pivotally connected by link 20 with the slide-bar 21, resting upon longitudinal beam 8 and between the side plates 22, secured to and projecting above said beam, said plates and beam together forming a channel for the reciprocatory bar 21, which bar is pivoted at its front end, as at 23, to the inner ends of a pair of levers 24, fulcrumed, as at 25, upon the rear part of frame 1. (See Figs. 3 and 4.)

The outer ends of levers 24 are pivotally connected to the longitudinal reciprocatory bars 26, provided at their front ends with depending arms 27, mounted upon a shaft 28, extending transversely of and below the frame and journaled in the bearing-boxes 29, slidingly mounted in brackets 30, bolted or otherwise secured to the under side of the frame, and mounted rigidly upon or forming an enlargement of said shaft between arms 27 is a winding-drum 31. A pair of ratchet-wheels 32, having their teeth disposed downward and forward and arranged between arms 27 and bearing-boxes 29, are also mounted rigidly upon said shaft, and in order to accommodate said wheels when the bearing-boxes are slid forward in the brackets in a manner which will hereinafter appear the front bar of the frame may be notched, as shown at 33, or may be situated sufficiently in advance of the bearing-boxes to permit such forward movement without the provision of said notches.

Mounted upon the outer ends of shaft 28 are small cog-wheels 34, (see Fig. 6,) adapted to occupy the position shown in said figure when dog 19, Figs. 1 and 2, engages the middle notch 17 of the sector. When lever 18 is adjusted to cause the dog to engage the foremost notch, as shown in said figures, the levers 24 are thrown to the position shown in Fig. 3 to advance the reciprocatory bars 26, and sliding boxes 29 forward cause cog-wheels 34 to mesh with the internal cog-wheels 4. When the lever is adjusted to cause the dog 19 to engage the rearmost notch, the bars 26 are withdrawn and cog-wheels 34 are thrown into engagement with cog-pinions 5. My object in thus throwing the winding-drum into engagement with cog-wheels 4 or 5, or with neither, will hereinafter appear.

36 designates gravity-dogs pivoted to lugs 35 of bars 26 and engaging ratchet-wheels 32 when the load of hay is being elevated or when the machine is traveling to or from the field without affecting the vertical position of the rake-carrying frame—in other words, when the machine is out of gear, as indicated in Fig. 6. Projecting laterally from said dogs are arms or pins 37, which are adapted as bars 26 move forward to throw wheels 34 into engagement with cog-wheels 4 to ride up the inclined or cam surfaces 38 of plates 39, bolted to frame 1, as shown in Figs. 1 and 5, and thereby raise the dogs out of engagement with the ratchet-wheels to permit the latter to rotate in the direction opposite to that indicated by the arrow, Fig. 5.

The superstructure of the machine consists of a pair of standards 40, mounted upon the frame 1 and connected at and near their upper ends by cross-bars 41 42, respectively, the horizontal bar 43 projecting rearwardly from the center of cross-bar 41 and the parallel guide-bars 44 45 arranged in pairs and extending downward and rearward from bar 43 to bars 22, the bars of each pair being arranged at opposite sides of bars 22 and 43, as shown most clearly in Fig. 1.

46 designates a crane arranged vertically above the center of cross-bar 41 and provided with a cylindrical stem depending through the bar 43, bar 41, and bar 42 by preference and provided with a wheel 47, suitably journaled and running upon the supporting-bracket 48, bolted or otherwise secured to bar 41, the crane carrying pendently from its front end a guide-sheave 49. A pair of guide-sheaves 50 are arranged likewise pendently from cross-bar 41 at suitable distances apart. The object of the guide-sheaves will hereinafter appear.

Referring now to the frame for effecting the raising and lowering of the rake, 51 designates a cross-bar provided with a stem 52, projecting horizontally rearward between the guide-bars 44 45 and provided with rollers 53 at the front and rear sides, respectively, of and adapted to ride up and down upon said bars.

54 designates a horizontal bar occupying about the same horizontal plane as bar 51, but in advance of frame 1, and said bar is pivotally connected to bar 51 by the obliquely-extending links 55 56, the former being preferably arranged above and the latter below said connected bars, as shown clearly. Said bars are arranged in intersecting vertical planes, so as to constitute a cross, when the rake is gathering hay, and the former is provided with a depending lug 55$^a$ to rest upon the front bar of frame 1 (see Fig. 2) when the rake is depressed, and thus relieve the supporting-cables, to be presently described, of part of the weight of the rake-carrying frame and the accumulating hay. The link 56 is provided with an opening 57, engaging the curved guide-rod 58, which extends almost vertically from the front end of frame 1 for about one-third of its height and then curves gradually rearward and sidewise and is secured at its upper end to the bracket 59, projecting laterally from the adjacent standard 40, the connection being made secure by means of a tap or nut 60.

61 designates arms depending from bar 54 at the front side of frame 1 and pivotally supporting the rake, the same comprising, preferably, the cross-bar 62, forwardly-projecting teeth 63, of suitable form and size, and the forwardly and upwardly projecting arm 64, the latter being connected by a cable 65, extending back through the guide eye or loop 66, projecting upward from the junction-point of bar 51 and stem 52, and under the guide-sheave 67, suitably carried by said stem, to the lever 68, mounted upon the rear end of said stem and within convenient reach of the driver upon the seat, who by grasping said lever and swinging it from the position shown in dotted lines to the position shown in full lines, Fig. 2, raises the rake from the position shown in dotted lines to the position shown in full lines, same figure, and secures it in such elevated position by the automatic engagement with arm 64 of the catch 69, secured to and below bar 54, the forward end of said catch being rounded, as shown most clearly in Fig. 3, in order that the upwardly-moving arm 64 may strike and push to one side said catch, the latter being caused to swing back under said arm by the retraction of spring 71, connected at its opposite ends to bar 54 and the laterally-projecting arm 70 of the catch. To automatically trip this catch and permit the rake to swing down and discharge its load in a manner hereinafter explained, arm 70 of the catch is connected by a rope or cable 72 to the eye 66 or other fixed point of cross-bar 51. (See Figs. 2 and 3.)

73 designates a cable extending around guide-sheave 49 and attached at one end to the winding-drum 31, as shown most clearly in Figs. 2 and 3, the front strand of said cable preferably terminating in the downwardly-diverging branches 74, connected to bar 54 at equal distances from its ends, as shown clearly in Figs. 1 and 3.

75 designates a pair of cables engaging guide-sheaves 50 and secured at their ends to cross-bar 51, as shown at 76, and at their front ends to the winding-drum 31, as shown in Figs. 1, 2, and 3, the front strand of said cables extending from the same side of the winding-drum as the rear strand of cable 73.

77 designates a cable attached at its front end to the winding-drum, so as to wind thereon when cables 73 and 75 are unwinding, and extending rearwardly upon the guide-sheaves 78 79, depending from frame 1 and beam 8, and extending from the last-named guide-sheave up through said beam and the slot 80 in the superposed slide-bar 21 and attached permanently to the eyebolt 81, depending from the stem 52 of the rake-carrying frame.

When driving to or from the field, the lever 18 has its dog 19 engaging the middle notch 17 of the sector 16, and the rake is supported, as shown in full lines, Fig. 2, the cog-wheels 34 occupying an intermediate position between cog-wheels 4 and 5 of the forward carrying-wheels, as shown in Fig. 6. When the field is reached, the driver trips catch 69, preferably by means of a branch 82 of cord or cable 72, when the rake gravitates to the position shown in dotted lines, Fig. 2, and under the forward movement imparted to the machine by the animals hitched to singletrees 9ª begins to gather up the hay. When a sufficient load has accumulated upon the rake, the driver grasps lever 68 and pulls it from the position shown in dotted to the position shown in full lines, Fig. 2, the rake being elevated by this movement to its original position and supported thereat by the spring-actuated catch 69, which was pushed aside in the upward movement of arm 64 and then thrown back to its original position below said arm in its elevated position. The driver now starts toward the stack, and when he has approached to within the required distance he grasps lever 18 and pulls it rearward until the dog 19 engages the rearmost notch 17 of the sector, as shown in Fig. 2. This movement slides bar 21 forward, because linked to the lower end of said lever, and the latter being operatively connected to the rock-levers 24 (see Fig. 3) moves bars 26 rearward, and consequently slides the winding-drum 31 and the connected parts rearward, the cog-wheels 34 upon the shaft of said drum meshing with the cog-pinions 5 of wheels 3, which moving forward instantly impart movement to the drum in the direction indicated by arrows, Figs. 2 and 5, and thereby simultaneously wind cables 73 and 75 upon the drum and unwind cable 77 off the drum. The effect of winding these cables upon the drum is to raise the rake-carrying frame bodily in a horizontal plane and to maintain it in such position by preventing its rear end or stem 52 from kicking upward through the medium of the restraining-cable 77, which pays out at a speed corresponding to that with which the cables 73 and 75 are wound up, as will be readily understood. As the rake swings sidewise in its upward movement the connected rake-carrying frame is advanced, (see Fig. 3,) and to such advance movement of the frame the pitch or slope of the guide-bars 44 45 is accommodated, the rollers holding the frame level and reducing the friction to be overcome to the minimum. As the rake-carrying frame rises it is gradually turned through the engagement of link 56 with the curved guide-rod 58 until eventually the rake as it assumes a position near the top of standards 40 extends at right angles to and at one side of the machine, the crane 46 under the tension of cable 73 accommodating itself to the new position of the rake by swinging to the position shown in Fig. 3. As the rake attains this position the distance between spring-catch 69 and the eye 66 of the rake-carrying frame is so far increased that the connecting-cable 72 is drawn taut and immediately thereafter swings catch 69 pivotally to the position shown in Fig. 3, and therefore permits the rake to drop and discharge the load of hay upon the stack over which the rake at this time projects. This automatic discharge of hay takes place without arresting the movement of the machine, and immediately thereafter the driver grasps lever 18 and throws it forward, so that the dog 19 engages the foremost notch of the sector, and consequently throws the cog-wheels 34 into engagement with the cog-wheels 4 of the carrying-wheels, when instantly the winding-drum reverses its direction of rotation and simultaneously begins to unwind the cables 73 and 75 therefrom and rewind cable 77 thereon, thereby lowering the rake-carrying frame at a speed proportionate to its ascent. The guide-rod 58 at the same time swings it gradually around to the front, accompanied in such movement by the crane, until eventually the parts are again positioned, as shown in Fig. 2, the rake being as in dotted lines said figure, unless the operator preferred by the proper manipulation of lever 68 to raise the rake temporarily to the position shown in full lines in said figure. The machine is now ready to gather a second load of hay, and all future operations are the same as those described. If the driver should misjudge his distance and throw the lever in gear to elevate the load too soon, he can rectify this mistake and support the load at the elevation it has attained by throwing the drum-gear wheels 34 to the position shown in Fig. 6, the dogs 36, carried by bars 26, preventing the unwinding of the drum by engagement with ratchet-wheels 32, as will be readily understood.

If the operator desires to discharge the load before the rake reaches its limit of upward movement, he can do so by tripping the catch through the medium of cable 82.

From the foregoing it will be seen that I have produced a combined hay rake and stacker, whereby the driver is enabled to approach the stack tangentially and after delivering the load of hay pass directly on by the stack without the necessity of backing or turning, as would be the case if he had to drive up against the stack and deliver from the front end of the machine. It will also be understood that the invention possesses the features of advantage enumerated as desirable in the statement of invention and that the operation of gathering and stacking the hay can be accomplished by one man as satisfactorily and in less time than heretofore has been possible with a number of men.

While I have described and illustrated the preferred embodiment of the invention, I wish it to be understood that various changes may be made in the form, proportion, detail construction, or arrangement of the parts without departing from the spirit and scope or sacrificing any of the advantages of the appended claims.

Having thus described the invention, what I claim as new, and desire to secure by Letters Patents, is—

1. A combined hay-rake and side-delivery stacker, comprising a wheeled frame, a rake-carrying frame, the rake being pivoted thereto, a catch carried by the rake-carrying frame to hold the rake elevated, means whereby the forward movement of the machine shall effect the raising or lowering of the rake-carrying frame, a flexible connection between said catch and a fixed point on the rake-carrying frame, and a guide extending from the lower front part to the upper side part of the wheeled frame and engaging and having a sliding relation with the rake-carrying frame and adapted as the latter rises to increase the distance between the point of connection of the catch with the said flexible connection and the fixed point to which the opposite end of said flexible connection is secured in order that the catch shall be automatically tripped by said flexible connection when the rake-carrying frame attains a certain position, substantially as described.

2. A combined hay-rake and side-delivery stacker, comprising a wheeled frame, a rake-carrying frame, the rake being pivoted thereto, a catch carried by the rake-carrying frame to hold the rake elevated, means whereby the forward movement of the machine shall effect the raising or lowering of the rake-carrying frame, a flexible connection between said catch and a fixed point on the rake-carrying frame, a guide extending from the lower front part to the upper side part of the wheeled frame and engaging and having a sliding relation with the rake-carrying frame and adapted as the latter rises to increase the distance between the point of connection of the catch with the said flexible connection and the fixed point to which the opposite end of said flexible connection is secured in order that the catch shall be automatically tripped by said flexible connection when the rake-carrying frame attains a certain position, and a branch rope or cable from said flexible connection within reach of the driver for tripping the catch at an intermediate point if desired, substantially as described.

3. A combined hay-rake and side-delivery stacker, comprising a wheeled frame, a guide carried thereby, a rake-carrying frame fitted upon said guide to swing the rake laterally as it ascends or descends, the rake being pivoted to said frame, a catch carried by the frame to hold the rake-teeth substantially horizontal, a drum geared to certain carrying-wheels of the machine, cables suitably guided and attached at their opposite ends to said drum and rake-carrying frame, means whereby the forward movement of the machine shall effect the raising or lowering of the rake-carrying frame, a flexible connection between said catch and a fixed point on the rake-carrying frame which automatically trips the catch and permits the rake to swing downward as the distance between said fixed point and the catch grows more remote by the rake swinging to a position at one side of the machine, and a branch rope or cable from said flexible connection within reach of the driver for tripping the catch at an intermediate point if desired, substantially as described.

4. A combined hay-rake and side-delivery stacker, comprising a wheeled frame, a vertically-adjustable rake-carrying frame, a winding-drum, a slide-frame carrying said drum, means for advancing or withdrawing said frame, and means whereby the forward movement of the carrying-wheels shall rotate the drum forward or backward according to the position of said slide-frame, a lever for throwing the drum into or out of engagement with said carrying-wheels, and means to prevent back rotation of the drum when out of gear with the carrying-wheel, substantially as described.

5. A combined hay-rake and side-delivery stacker, comprising a wheeled frame, having a superstructure and a sheave-carrying crane mounted thereon, a rake-carrying frame, the rake being pivoted to the front end of the frame, a guide to swing the rake laterally as said frame is raised or lowered, a drum journaled on the wheeled frame, a cable engaging the crane-sheave and attached at one end to the drum, and provided at its opposite end with branch cables attached to the front portion of the rake-carrying frame, a cable suitably guided in the superstructure and attached at its opposite ends to the drum and the rake-carrying frame, means to rotate the drum and raise the rake-carrying frame upon said guide, means to trip the rake when it has attained the desired elevation, means to reverse the direction of the drum rotation and lower the rake-carrying frame, and means to raise the rake to its original position with relation to the rake-carrying frame, substantially as described.

6. A combined hay-rake and side-delivery stacker, comprising a wheeled frame, having a superstructure, a guide carried by said frame, a rake-carrying frame embodying a pair of bars, crossed links pivotally connected to said bars, one of them provided with an opening engaging said guide, a winding-drum, cables guided in said superstructure and attached at their opposite ends to said drum and rake-carrying frame, means to rotate said drum in one direction to raise the rake and in the opposite direction to lower it, substantially as described.

7. A combined hay-rake and side-delivery stacker, comprising a wheeled frame, a rake-carrying frame, a guide slidingly connected to the rake-carrying frame and extending from the lower front part to the upper side part of the wheeled frame, a drum geared to certain carrying-wheels of the machine, cables suitably guided and attached at their opposite ends to said drum and rake-carrying frame, means whereby the forward movement of the machine shall effect the raising or lowering of said rake-carrying frame by rotating the drum in one direction or the other, parallel guide-bars extending obliquely upward and forward and carried by the wheeled frame, and rollers secured to the rake-carrying frame and adapted to travel upon said guide-bars, substantially as described.

8. A combined hay-rake and side-delivery stacker, comprising a wheeled frame, a rake-carrying frame, the rake being pivoted to said frame, a catch carried by the rake-carrying frame to hold the rake-teeth substantially horizontal, a guide slidingly connected to the rake-carrying frame and extending from the lower front part to the upper side part of the wheeled frame, a drum geared to certain carrying-wheels of the machine, cables suitably guided and attached at their opposite ends to the drum and rake-carrying frame, means whereby the forward movement of the machine shall effect the raising or lowering of said rake-carrying frame by rotating the drum in one direction or the other, and a flexible connection between said catch and a fixed point on the rake-carrying frame, substantially as described.

9. A combined hay-rake and side-delivery stacker, comprising a wheeled frame, parallel guide-bars extending upwardly and forwardly and forming a part of the frame, a rake-carrying frame embodying a stem guided by said bars and provided with rollers to travel thereon, a guide slidingly connected to the rake-carrying frame and extending from the lower front part to the upper side part of the wheeled frame, and means whereby the forward movement of the machine shall effect the raising or lowering of the rake-carrying frame, substantially as described.

10. A combined hay-rake and side-delivery stacker, comprising a wheeled frame, a pair of parallel guide-bars extending obliquely upward and forward and forming a part of said frame, a rake-carrying frame, consisting of a pair of cross-bars, intersecting bars pivotally connecting said cross-bars, and a rigid stem extending rearward from one of said cross-bars and guided upon said parallel guide-bars, a guide extending through one of the intersecting bars and from the lower front part to the upper side part of the wheeled frame, and means whereby the forward movement of the machine shall effect the raising or lowering of the rake-carrying frame, substantially as described.

11. A combined hay-rake and side-delivery stacker, comprising a wheeled frame, a pair of parallel guide-bars extending obliquely upward and forward and forming a part of said frame, a rake-carrying frame, consisting of a pair cross-bars, intersecting bars pivotally connecting said cross-bars, and a rigid stem extending rearward from one of said cross-bars and guided upon said parallel guide-bars, the rake being pivoted to the front end of said frame, a catch carried by said frame to normally hold the rake elevated, a cable suitably guided within reach of the driver and connected to the rake to elevate the same, a cable connecting the catch with a fixed point on the rake-carrying frame, a drum arranged to be thrown in or out of gear with certain carrying-wheels of the machine, pulleys suspended from the upper part of the wheeled frame, cables engaging said pulleys and connected at their rear ends to the rear cross-bar of the rake-carrying frame, and at their front ends to said drum, a cable extending from the opposite side of said drum and connected at its opposite end to the under side of the stem of the rake-carrying frame, a crane mounted upon the wheeled frame and provided with a pulley, and a cable extending from the same side of the drum as said pair of cables and provided with branch cables secured to the front cross-bar of the rake-carrying frame, a guide extending loosely through one of said intersecting bars from the lower front part to the upper side part of the wheeled frame, and means for imparting advance or retrograde movement and maintaining the rake-carrying frame in substantially a horizontal plane during its ascent and descent, substantially as described.

12. A combined hay-rake and side-delivery stacker, comprising a wheeled frame, a superstructure thereon, a pulley-carrying crane upon the superstructure, a rake-carrying frame, a drum, a cable engaging the pulley on the crane and attached to said drum and rake-carrying frame, a pair of cables suitably guided and attached at their opposite ends to the rake-carrying frame and the drum, means whereby the forward movement of the machine shall operate the drum and raise or lower the rake-carrying frame, and means for causing the front part of the rake-carrying frame to swing around with the rake and incidentally operate the crane to accommodate such swinging movement, substantially as described.

In testimony whereof I affix my signature in the presence of two witnesses.

JONATHAN W. WOOLERY.

Witnesses:
  H. C. RODGERS,
  G. Y. THORPE.